United States Patent
Greimel-Làngover et al.

(10) Patent No.: US 12,300,195 B2
(45) Date of Patent: *May 13, 2025

(54) OPTICAL PROXIMITY SENSING WITH REDUCED PIXEL DISTORTION

(71) Applicant: ams International AG, Jona (CH)

(72) Inventors: Bernhard Greimel-Làngover, Gleisdorf (AT); Christian Halper, Olbendorf (AT); Helmut Theiler, Lieboch (AT); Herbert Lenhard, Graz (AT); Josef Kriebernegg, Graz (AT); Manuel Hoerbinger, Voitsberg (AT); Peter Bliem, Premstaetten (AT); Whitney Hernandez, Murphy, TX (US)

(73) Assignee: AMS INTERNATIONAL AG, Jonas (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,897

(22) Filed: Aug. 5, 2022

(65) Prior Publication Data

US 2022/0375432 A1     Nov. 24, 2022

Related U.S. Application Data

(63) Continuation of application No. 17/308,183, filed on May 5, 2021, now Pat. No. 11,410,631, which is a
(Continued)

(51) Int. Cl.
*G09G 5/12*     (2006.01)
*G01S 17/04*    (2020.01)
(Continued)

(52) U.S. Cl.
CPC ............... *G09G 5/12* (2013.01); *G01S 17/04* (2020.01); *G09G 3/3208* (2013.01);
(Continued)

(58) Field of Classification Search
CPC ......... G09G 2300/0465; G09G 3/3208; G09G 3/3225; G09G 5/12; G09G 2310/08;
(Continued)

(56) References Cited

U.S. PATENT DOCUMENTS

2007/0002168 A1   1/2007  Vasquez et al.
2007/0070258 A1   3/2007  Kinoshita et al.
(Continued)

FOREIGN PATENT DOCUMENTS

CN    106445263 A    2/2017
CN    107920142 A    4/2018
(Continued)

OTHER PUBLICATIONS

European Patent Office Action for Application No. 20724819.6 dated Mar. 9, 2023 (6 pages).
(Continued)

*Primary Examiner* — Shaheda A Abdin
(74) *Attorney, Agent, or Firm* — Michael Best & Friedrich LLP

(57) ABSTRACT

A method of operating an optical proximity sensor of a computer device having a display, where the optical proximity sensor is located beneath or otherwise adjacent to the display. The method comprises obtaining a vertical synchronization signal from a display driver, and synchronizing periodic illumination of a light emitter of the optical proximity sensor with the vertical synchronization signal.

8 Claims, 5 Drawing Sheets

Related U.S. Application Data continuation of application No. PCT/EP2020/062744, filed on May 7, 2020.

(60) Provisional application No. 62/847,611, filed on May 14, 2019.

(51) Int. Cl.
*G09G 3/3208* (2016.01)
*H04M 1/02* (2006.01)

(52) U.S. Cl.
CPC . *G09G 2310/0243* (2013.01); *G09G 2310/08* (2013.01); *G09G 2320/0233* (2013.01); *G09G 2360/14* (2013.01); *H04M 1/0266* (2013.01)

(58) Field of Classification Search
CPC ....... G09G 2320/0233; G09G 2354/00; G09G 2310/0243; G09G 2360/14; G01S 17/04; H04M 1/0266
See application file for complete search history.

(56) References Cited

U.S. PATENT DOCUMENTS

| | | | |
|---|---|---|---|
| 2008/0074381 A1 | 3/2008 | Kumamoto | |
| 2008/0252795 A1* | 10/2008 | Bone | H04N 9/3155 348/759 |
| 2009/0195511 A1 | 8/2009 | Cites et al. | |
| 2009/0285310 A1 | 11/2009 | Iwami et al. | |
| 2010/0220040 A1* | 9/2010 | Kwak | G09G 3/3233 345/76 |
| 2010/0231528 A1 | 9/2010 | Wolfe et al. | |
| 2013/0194229 A1 | 8/2013 | Sabo et al. | |
| 2013/0257847 A1 | 10/2013 | Lee et al. | |
| 2016/0198103 A1 | 7/2016 | Tanaka et al. | |
| 2017/0048459 A1 | 2/2017 | Masuda et al. | |
| 2017/0090611 A1 | 3/2017 | Shepelev et al. | |
| 2019/0287463 A1* | 9/2019 | Zhang | G09G 3/3258 |
| 2019/0349527 A1* | 11/2019 | Masuda | H04N 23/6812 |

FOREIGN PATENT DOCUMENTS

| | | |
|---|---|---|
| CN | 108803917 A | 11/2018 |
| CN | 108897001 A | 11/2018 |
| EP | 1571644 A1 | 9/2005 |
| EP | 3291217 A1 | 3/2018 |
| JP | H05035254 A | 2/1993 |
| JP | 2001175218 A | 6/2001 |
| JP | 2006301864 A | 11/2006 |
| JP | 2007024994 A | 2/2007 |
| JP | 2008015755 A | 1/2008 |
| JP | 2008242468 A | 10/2008 |
| JP | 2008251020 A | 10/2008 |
| JP | 2010049206 A | 3/2010 |
| JP | 2011028058 A | 2/2011 |
| JP | 2011107829 A | 6/2011 |
| JP | 2012145778 A | 8/2012 |
| JP | 2014522523 A | 9/2014 |
| JP | 2016061934 A | 4/2016 |
| JP | 2018032033 A | 3/2018 |
| KR | 20170064179 A | 6/2017 |

OTHER PUBLICATIONS

Chinese Patent Office Action for Application No. 202080035784.5 dated Sep. 21, 2023 (20 pages including English translation).
Japanese Patent Office Notice of Reasons for Refusal for Application No. 2021568143 dated Jul. 30, 2024 (5 pages including English translation).
Japanese Patent Office Action for Application No. 2021-568143 dated Apr. 2, 2024 (8 pages including English machine translation).
Japanese Patent Office Notice of Reasons for Refusal for Application No. 2021-568143 date Jul. 18, 2024 (6 6 pages with English machine translation).
European Patent Office Action for Application No. 20724819.6 dated Aug. 19, 2024 (4 pages).
Japanese Patent Office Decision to Grant for Application No. 2021-568143 dated Sep. 9, 2024 (7 pages including English machine translation).
Darmadi, KTH Royal Institute of Technology, "Strobed IR Illumination for Image Quality Improvement in Surveillance Cameras" Publicly available as early as Oct. 1, 2018 (49 pages).
Chinese Patent Office Action for Application No. 202080035784.5 dated Apr. 22, 2024 (12 pages including English machine translation).
Chinese Patent Office Action for Application No. 202080035784.5 dated Aug. 27, 2024 (14 pages including English machine translation).
Chinese Patent Office Rejection Decision for Application No. 202080035784.5 dated Nov. 4, 2024 (13 pages including English machine translation).
Taiwanese Intellectual Property Office Action for Application No. 109115715 on Apr. 13, 2021 (30 pages including English machine translation).
Intellectual Property Office of Taiwan Office Action for Application No. 109115715 dated Apr. 13, 2021 (16 pages Including English translation).
International Search Report and Written Opinion for Application No. PCT/EP2020/062744 dated Jul. 9, 2020 (10 pages).

* cited by examiner

OPTICAL PROXIMITY SENSING WITH REDUCED PIXEL DISTORTION

TECHNICAL FIELD

The present invention relates to optical proximity sensing in devices with displays, where the proximity sensors are located behind or otherwise in proximity to the displays.

BACKGROUND

Many smartphones use optical proximity sensors to determine when the display should be turned on or off. This is typically for the purpose of saving battery power when, for example, the smartphone is placed in a user's pocket, or for preventing unwanted on-screen display button selections when a phone call is received. This can also be the case with other computer devices having displays, such as tablets and laptop computers, where it is desirable to turn off the display when the device is closed or otherwise covered. Optical proximity sensing typically relies on emitting near infra-red (NIR) light and measuring any light energy reflected back. Reflection above a certain threshold indicates that the display is likely to be covered.

Previously, NIR light emitters for this purpose were located in the bezel of a smartphone or other device. In recent years however, due to demand for a high screen to body ratio, the bezel previously used to host the proximity sensor has been eliminated from many devices. Many smartphones today use Organic Light Emitting Diode (OLED) displays. OLED displays may permit some light, including NIR light, to pass through the display. Therefore, proximity sensors may be located behind the OLED display.

The energy of the NIR light emitted through the display can however cause a visible distortion on the display; for example a bright spot appears in the display above the location of the proximity sensor. These distortions may be visible under many conditions, for example even if the screen is displaying a black image.

SUMMARY

According to a first aspect of the present invention there is provided a method of operating an optical proximity sensor of a computer device having a display, where the optical proximity sensor is located beneath or otherwise adjacent to the display. The method comprises obtaining a vertical synchronization signal from a display driver, and synchronizing periodic illumination of a light emitter of the optical proximity sensor with the vertical synchronization signal.

The display may be an Organic Light Emitting Diode display.

The optical proximity sensor may be an Infra-Red optical proximity sensor, for example a Near Infra-red optical proximity sensor.

The step of synchronizing may comprise introducing a delay to the vertical synchronization signal and using pulses of the delayed signal to trigger said periodic illumination. The delay may result in illumination of the emitter immediately prior to blanking or dimming of the display area directly above the optical proximity sensor. Alternatively, the delay may result in illumination of the emitter partially coincident with the blanking or dimming of the display area directly above the optical proximity sensor.

The method may comprise illuminating the light emitter following each synchronization pulse of the vertical synchronisation signal. Alternatively, the light emitter may be illuminated following each sequence of a plurality of synchronization pulses of the vertical synchronisation signal.

According to a second aspect of the present invention there is provided a computer device comprising a display and an optical proximity sensor located beneath or otherwise adjacent to the display and comprising a light emitter. The device further comprises a display driver for generating a vertical synchronisation signal, and is configured to synchronize periodic illumination of the light emitter with the vertical synchronization signal. This synchronisation may be performed by a synchronisation circuit, for example of the optical proximity sensor or by a processor.

The display may be an Organic Light Emitting Diode display.

The optical proximity sensor may be being an Infra-Red optical proximity sensor, for example a Near Infra-Red optical proximity sensor.

The device may comprise a delay circuit, either integrated into the optical proximity sensor or implemented as a component separate therefrom, for delaying the vertical synchronisation signal, the delay circuit being coupled to the light emitter to trigger illumination of the light emitter. The delay circuit may delay the vertical synchronisation signal to cause illumination of the emitter immediately prior to blanking or dimming of the display area directly above the optical proximity sensor. Alternatively, the delay circuit may delay the vertical synchronisation signal to cause illumination of the emitter partially coincident with the blanking or dimming of the display area directly above the optical proximity sensor.

The device may be a smartphone, tablet or laptop computer.

Embodiments of the present invention provide a means for reducing or eliminating pixel distortion in a display, while continuing to allow use of a NIR light source located behind the display for the purpose of optical proximity sensing.

DETAILED DESCRIPTION

The problems caused by use of a NIR proximity sensor beneath a display such as an OLED display have been discussed above. The solution that is discussed below flows from a recognition that distortion can be reduced by illuminating the proximity sensor only at an optimized point in time relative to the state of operation of the display pixels.

During operation of a display, the display is periodically refreshed at a picture refresh rate. This rate may be for example 60 Hz, i.e. the display is updated 60 times in one second. The start of a new frame is indicated by a Vertical Synchronization (VSYNC) pulse signal generated by a display driver of the device. The VSYNC signal synchronises the processor's frame rate and the display's refresh rate such that the frames per second (FPS) is limited by the refresh rate and no frames are skipped. The VSYNC pulse indicates the start of a new frame (image) on the display. The present proposal uses the VSYNC pulse to synchronize the emission of light from the proximity sensor to the display refresh rate. Specifically, the NIR optical emission is synchronized to start at a time point in the refresh cycle of the display when resulting distortion to the image is reduced or eliminated. Depending upon the specific OLED display present in the device, the optimal time for emission may be immediately before or during the time when the display pixels above the proximity sensor are inactive. The present proposal allows for the continued use of a NIR proximity sensor under the display, whilst allowing for the bezel to be thinner or absent entirely, and avoiding the need for more expensive solutions such as the use of far infra-red (FIR) emitters or ultrasonic solutions.

Figure 1:
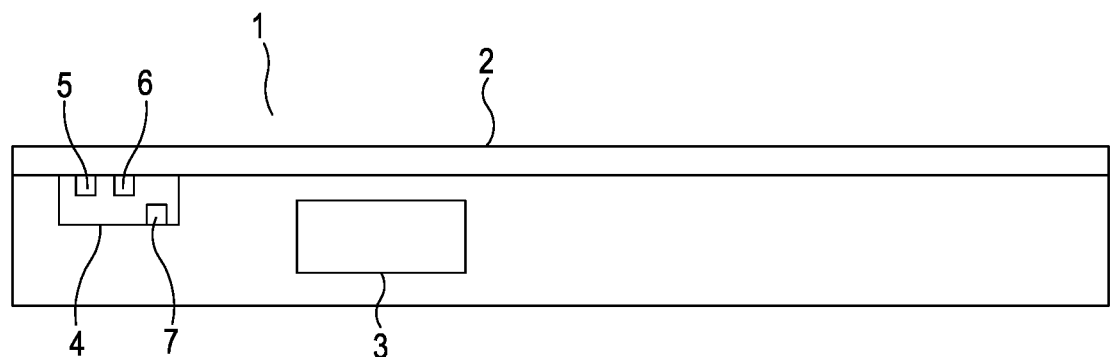
FIG. 1 shows schematically a smartphone with proximity sensor.

FIG. 1 illustrates schematically an exemplary smartphone 1, shown in cross-section through a plane perpendicular to the plane of the display. The smartphone 1 comprises an OLED display 2, an OLED display driver 3 and an NIR optical proximity sensor module 4 within the body of the smartphone, below the OLED display. The display driver 3 is typically implemented by way of a combination of hardware and software, where the hardware may comprise a Graphical Processing Unit (GPU) and associated memory. The proximity sensor module 4 comprises a NIR emitter 5 and adjacent detector 6 which are provided with a clear line-of-sight to the underside of the display 2. Although not shown, the sensor module may comprise optical components such as lenses. The proximity sensor module 4 is also provided with an integrated delay circuitry 7, and is configurable through a register to optimize the timing of light emission for reduced display pixel distortion. The exact configuration for a given display may be determined empirically, e.g. during a prototyping phase of a product.

Figure 2:
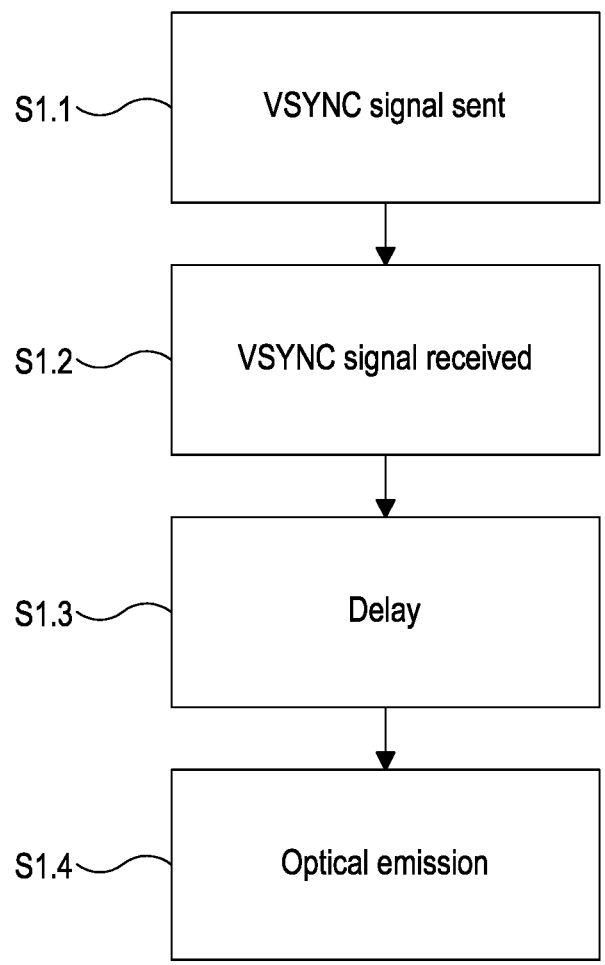
FIG. 2 is a flow chart illustrating at a high level an optical proximity sensing method.

FIG. 2 is a flow diagram showing at a high level a process for optical proximity sensing with reduced pixel distortion in the smartphone of FIG. 1. During operation of the smartphone, a VSYNC signal is generated periodically by the OLED display driver 3 (S1.1) for the purpose of refreshing the display. Here, the VSYNC is additionally provided to the integrated delay circuit 7 of the optical proximity sensor module 4 (S1.2). When the delay circuit detects a timing (refresh) pulse in the VSYNC signal, it initiates a delay timer (S1.3) and, following expiry of the delay timer, triggers NIR light emission (S1.4) by the emitter 5 for a predefined time period. The emitted light will pass through the OLED display 2 to interact with any object which may be directly in front of the display. Any light reflected back through the OLED display is detected by the detector 6.

Figure 3:
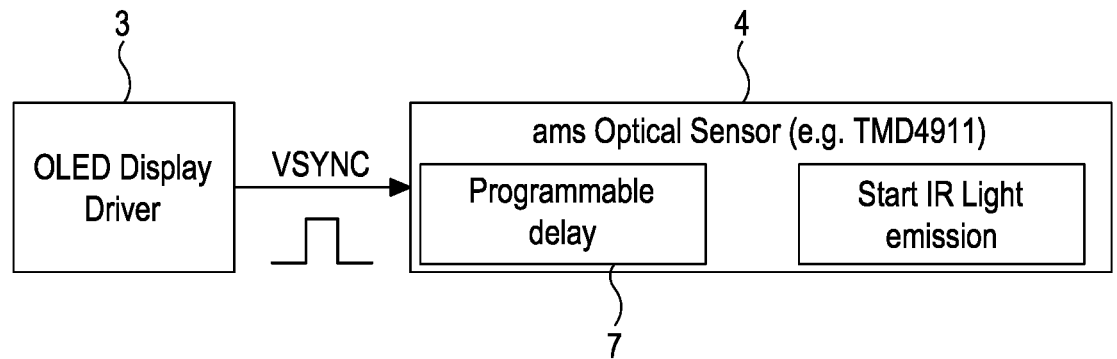
FIG. 3 shows schematically the operational interaction of components of the smartphone of FIG. 1.

FIG. 3 illustrates schematically the relevant functional components of the smartphone 1 of FIG. 1. These include the OLED display driver 3 and the optical proximity sensor module 4 which comprises the integrated delay circuit 7. The VSYNC signal is shown being transmitted from the driver 3 to the delay circuit 7 of the module 4.

Figure 4:
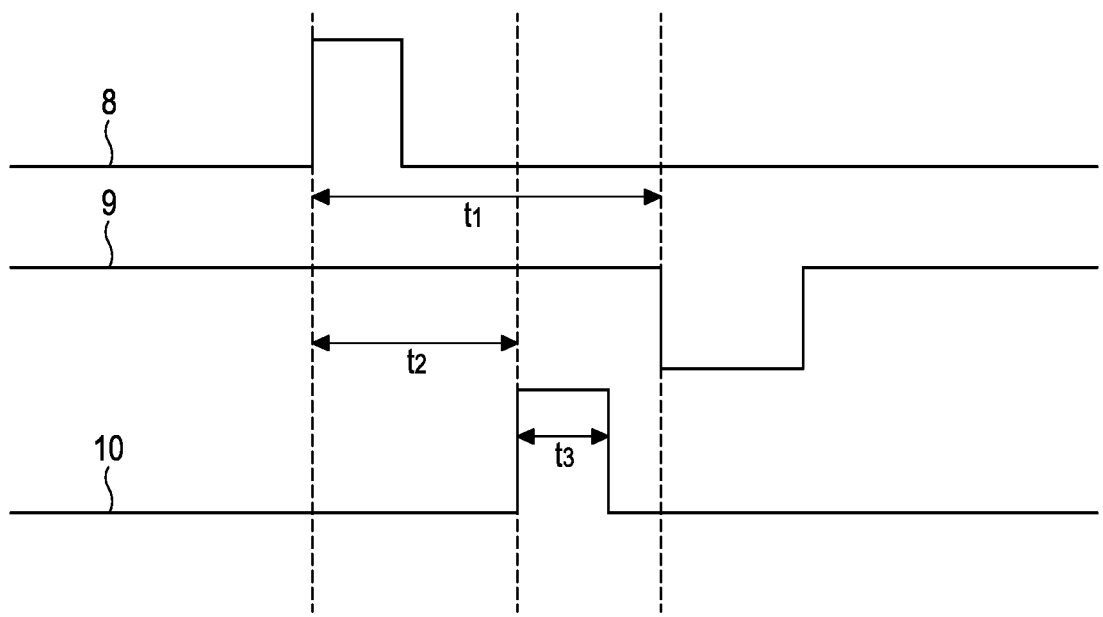
FIG. 4 illustrates a timing scheme for the smartphone of FIG. 1.

FIG. 4 illustrates an exemplary timing scheme. The upper trace 8 illustrates the VSYNC signal as generated by the OLED display driver 3, the middle trace 9 illustrates the display brightness at the location above the proximity sensor module 4, and the lower trace 10 illustrates light emission from the emitter 5 of the proximity sensor module 4. At a given time $t_1$ after the leading edge of a VSYNC pulse, the display brightness above the proximity sensor module 4 is temporarily decreased as the corresponding pixel lines are refreshed or 'blanked'. To take advantage of this state, after a time delay $t_2$ from the leading edge of the VSYNC pulse, the delay circuit 7 generates an emitter drive pulse to drive the emitter 5 of the proximity sensor module. This drive pulse has a duration $t_3$. The time periods $t_2$ and $t_3$ are optimized to minimize the visual distortion created by the NIR light pulse in the display 2. For example, timing may result in the NIR light pulse being generated very shortly before the blanking of the overlying display pixels.

Figure 5:
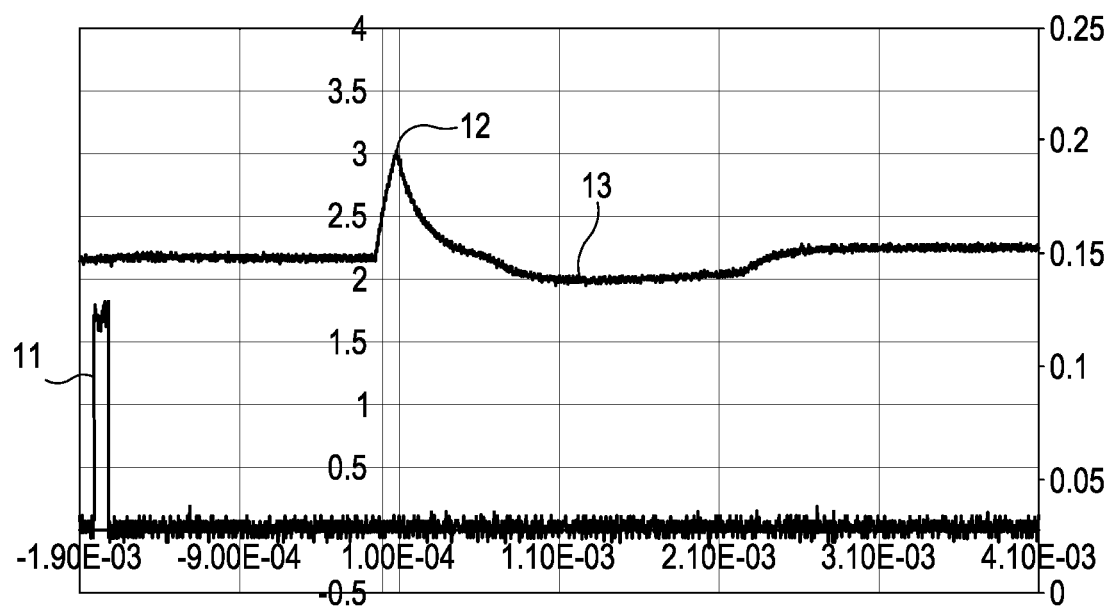
FIG. 5 shows exemplary traces produced using the timing scheme of FIG. 4.

FIG. 5 shows exemplary traces resulting from the steps of FIG. 2. The VSYNC pulse is shown by the peak 11 of the lower trace. Approximately 1.76 ms after the leading edge of the VSYNC pulse, the proximity sensor emits light (detected under test conditions using a NIR sensor located above the display), shown by the peak 12. Approximately 1.15 ms after emission of the proximity sensing light, the pixels are blanked, as shown by the trough 13.

Different displays and IR emitter(s) may have different timing requirements to achieve minimal distortion. For example, the time $t_1$ from the leading edge of the VSYNC pulse to the pixel line refresh will likely vary based upon the particular display and the location of the sensor module under the display. The commencement time $t_2$ and duration $t_3$ will vary accordingly.

It will be appreciated that the optical power of the emission will be optimized to reduce pixel distortion as best as possible.

Figure 6:
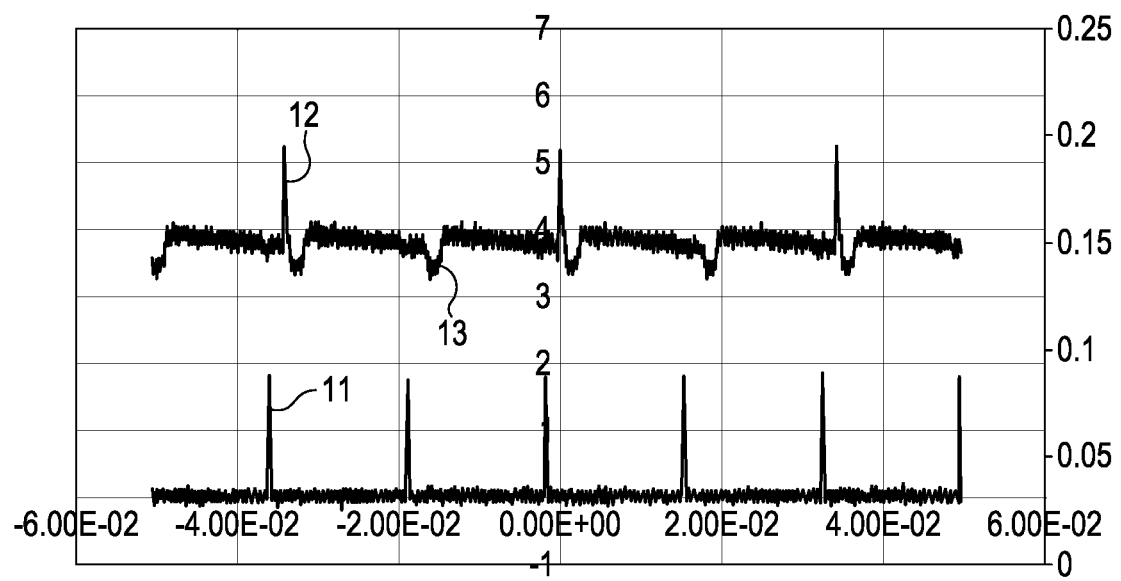
FIG. 6 shows alternative exemplary traces over several display cycles.

It will be appreciated that further modifications may be made to the timing scheme. For example, a long delay $t_2$, for example 10 ms or more, may be introduced to cause some VSYNC pulses to be skipped. As shown for example in FIG. 6, the NIR light pulses 12 may be triggered only on every second VSYNC pulse 11. Alternatively, a counter may be used in conjunction with a short delay, to only trigger a proximity measuring emission after a certain number of VSYNC pulses has occurred. Where the display is blanked more than once per VSYNC signal, which may occur for example when the display is operating at less than 100% brightness, pixel distortion may be optimised by synchronising the proximity pulse to occur before the first blanking following the VSYNC signal. Furthermore, the proximity pulse 12 may overlap with the blanking time 13.

Figure 7:
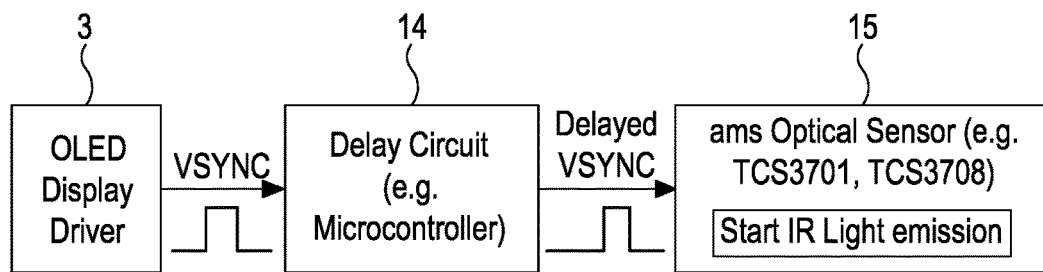
FIG. 7 shows schematically an alternative operational interaction of components of a smartphone.

Modifications may also be made to the apparatus of FIGS. 1 and 3. For example, as shown in FIG. 7, rather than the delay function being integrated into the proximity sensor, it may be performed by separate delay circuitry, for example microcontroller 14. The process carried out by the apparatus of FIG. 7 is shown at a high level by the flow diagram of FIG. 8. The VSYNC signal is sent from the OLED display driver 3 (S2.1) and received by external delay circuitry such as a microcontroller 14 (S2.2). The microcontroller adds a delay to the VSYNC signal (S2.3), and passes this delayed VSYNC signal to a proximity sensor 15 via a GPIO interface (S2.4). The arrival of the GPIO pulse at the proximity sensor (S2.5) triggers the start of the NIR light emission (S2.6). There may be a further delay inherent to the operation of the sensor, between when the GPIO pulse is received, and the light is emitted.

Figure 8:
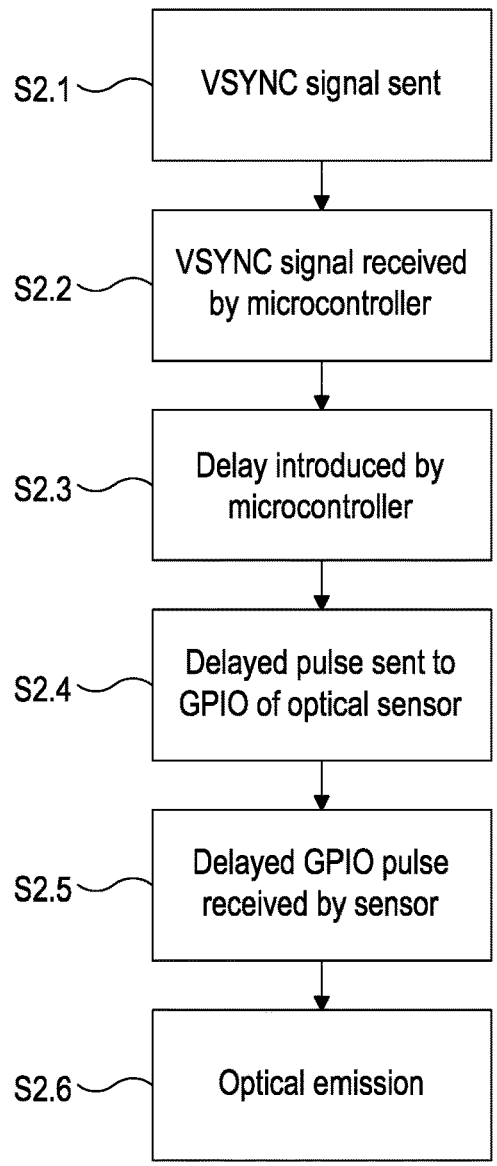
FIG. 8 is a flow chart illustrating at a high level an alternative optical proximity sensing method.
Figure 9:
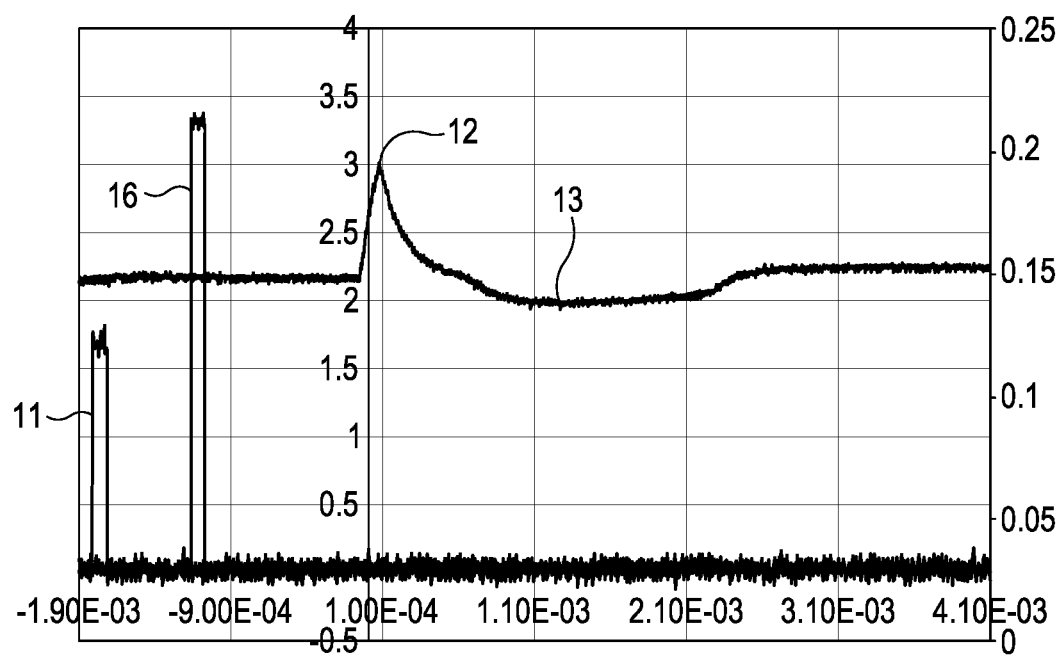
FIG. 9 shows exemplary traces produced using the method of FIG. 8.

Exemplary traces which may result from the architecture of FIG. 7 and carrying out the steps of FIG. 8 are shown in FIG. 9. The emitter drive signal (GPIO) pulse 16 is observed 0.650 ms after the leading edge of the VSYNC pulse 11. After a further delay of 1.11 ms after the leading edge of the GPIO pulse, the proximity sensor emits light, shown by the peak 12. Again, 1.15 ms after emission of the proximity sensing light, the pixels are blanked, as shown by the trough 13.

The optical emitter may be an NIR LED (for example emitting at 940 nm), Vertical-Cavity Surface-Emitting Laser (VCSEL) emitter, or any other suitable optical emitter which may generate an unwanted pixel distortion.

The invention claimed is:

1. A method of operating a display and an optical proximity sensor of a computer device, where the optical proximity sensor is located beneath the display, the method comprising:
operating a light emitter of the optical proximity sensor without modifying illumination of pixels of the display to accommodate the light emitter of the optical proximity sensor, by causing the light emitter of the optical proximity sensor to emit light after a signal associated with a start of a new frame and before blanking of display pixels which overly the light emitter of the optical proximity sensor; and
using pulses of the signal to synchronize periodic emission from the light emitter of the optical proximity sensor with illumination of the display pixels of the display;
wherein there is a period of time between an end of an emission period of the light emitter and a start of a related pixel blanking period; and
wherein synchronizing includes introducing a delay to the signal and using pulses of the delayed signal to trigger said periodic illumination.

2. A method according to claim 1, wherein said display is an Organic Light Emitting Diode display.

3. A method according to claim 1, wherein said optical proximity sensor is an Infra-Red optical proximity sensor.

4. A method according to claim 3, wherein the Infra-Red optical proximity sensor is a Near Infra-red optical proximity sensor.

5. A method according to claim 1, wherein said delay results in illumination of the emitter immediately prior to blanking or dimming of an area of the display directly above the optical proximity sensor.

6. A method according to claim 1, wherein said delay results in illumination of the emitter partially coincident with the blanking or dimming of an area of the display directly above the optical proximity sensor.

7. A method according to claim 1 further comprising illuminating the light emitter following a synchronization pulse of the signal.

8. A method according to claim 1 further comprising illuminating the light emitter following a sequence of a plurality of synchronization pulses of the signal.

* * * * *